$$\theta = \left(\frac{R_6}{R_6 - R_4}\right)\phi$$

INVENTOR
WILTON A. HARDY
BY Francis J. Thomas
ATTORNEY

3,432,771
OPTICAL SCANNING TECHNIQUES EMPLOYING AN OPTICAL CAVITY INCLUDING TWO REFLECTORS AND A FOCUSSING OBJECTIVE
Wilton A. Hardy, Ossining, N.Y., assignor to International Business Machines Corporation, Armonk, N.Y., a corporation of New York
Filed Dec. 18, 1964, Ser. No. 419,438
U.S. Cl. 331—94.5     16 Claims
Int. Cl. H01s *3/00;* G02b *17/00*

ABSTRACT OF THE DISCLOSURE

Apparatus is provided for changing the direction of a light beam in an optical cavity. The optical cavity consists of a focussing objective, which may be an active lasing medium, located between two reflectors, such as curved mirrors, having effective centers of curvature which are separated by a predetermined distance. The relative position of one center of curvature with the other center of curvature can be controlled, for example, by positioning one of the mirrors. Points on the reflectors are located at the object and image positions for the objective. When the active medium is suitably excited, the lasing mode is represented by a spot of light being formed on each mirror. The orientation of the lasing mode (and, hence, the positioning of the spots of light) is determined and controlled by the effective angular positioning of the reflectors.

---

In order to employ a laser as the light source in a scanner, the position of the output light must be controllable. This control can be provided by operating the laser in a fixed mode and directing the light with mechanically-controlled lenses or mirrors but the resultant scanning speed is limited by the speed of the controlling devices. Preferable techniques alter the orientation of the lasing mode directly by altering properties of the cavities. One such technique is shown in U.S. patent application Ser. No. 332,617, filed on Dec. 23, 1963, where Robert V. Pole describes methods and devices for altering the reflectivity of cavities to control the orientation of the lasing mode.

In the present invention, the orientation of the lasing mode is controlled by altering the optical geometry of the laser cavity to produce amplified angular changes in the orientation of the lasing mode. The reflectivity of the surfaces of the cavity is unaltered. The amplification factor enables the high-intensity laser output to be rapidly moved; thus, the device is useful as a scanner in various environments, including character recognition systems.

Generically, the invention consists of a focussing objective that is located in an optical cavity comprising two reflectors having effective centers of curvature, such as spherical concave mirrors or their equivalent flat mirror and lens configuration. An active laser medium also exists between the two reflectors and, in the preferred embodiments, the active medium is lens-shaped to also serve as the focussing objective. The reflectors are located at the object and image positions for the objective. When the active medium is suitably excited, the lasing mode is represented by a spot of light being formed on each mirror. The orientation of the lasing mode (and, hence, the positioning of the spots of light) is determined and controlled by the effective angular positioning of the reflectors.

In a basic embodiment of the present invention, an active laser lens is centered between two spherical mirrors having unequal radii of curvature, where the center of curvature of a first mirror is positioned at the center of the lens and the center of curvature of a second mirror is centered on one side or the other of the lens. With this arrangement, a spot of light is formed at the midpoint (axis) of each mirror by the action of the laser. All points on the surface of the first mirror are spaced from the center of the lens by equal distances (radial lines) so that this mirror has no control over the orientation of the lasing because light energy developed at any orientation would be reflected back to the lens and would contribute toward the formation of the required energy density to cause laser action. However, since the second mirror is not centered on the lens, only that energy impinging upon its midpoint (on the axis of the system) is reflected back to the lens by the second mirror to contribute to the energy density. That is, only the radial line from the midpoint of this mirror intersects the center of the lens. Energy developed at any other orientation is not reflected back upon itself by the second mirror because this energy strikes the surface of the mirror with an angle of incidence that does not equal 90°. Thus, in quiescent operation (with both centers of curvature on the system axis), the lasing mode is oriented such that a spot of light is formed at the midpoint of each mirror.

The orientation of the lasing mode can be altered by tilting the second mirror to cause another point on the surface of this mirror to describe a radial line that intersects the center of the lens.

The change in orientation of the lasing mode is significantly greater than the angular change of the tilted mirror, so that a slight movement of the mirror causes the spot of light to undergo a large movement.

In a preferred embodiment of the invention, the mirror is not physically tilted but, rather, an electro-optical deflector is provided to produce the same effect more rapidly than is possible by the use of mechanical motion. In this embodiment, the orientation of the lasing mode is controlled by electrical signals that are applied to the deflector.

Thus, a primary object of the present invention is to provide optical scanning techniques employing lasers.

Another object of the invention is to provide optical scanning techniques employing active later media that are arranged in controllable optical cavities so that angular changes in the effective configuration of the cavities cause larger changes in the orientation of the lasing mode.

Another object is to provide an optical scanner employing an active laser medium in a cavity which consists of two spherical mirrors, where physical adjustments of a mirror produce larger changes in the orientation of the lasing mode.

A further object of the invention is to provide an optical scanner employing an active laser medium in an optical cavity that contains an electro-optical deflector having a controllable deflection which produces an amplified change in the orientation of the lasing mode.

The foregoing and other objects, features and advantages of the invention will be apparent from the following more particular description of preferred embodiments of the invention, as illustrated in the accompanying drawings.

Figure 1:
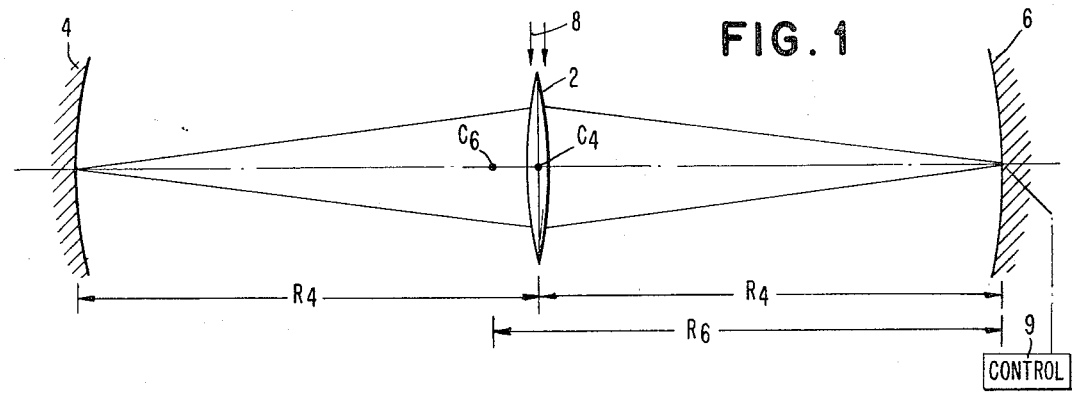
FIG. 1 is a diagram showing a first embodiment of the invention, which employs a mechanically-controllable laser cavity, in its quiescent state of operation.

In FIG. 1, an active laser medium 2 having the shape of a thin lens is centered between two spherical mirrors 4 and 6. The lens is preferably constructed from a doped ruby crystal or a uranium-doped calcium fluoride crystal, although other active laser media can be employed. The mirrors are separated from the lens along its optical axis by distances $R_4$ which equal the radius of curvature of mirror 4 (and double the focal length of mirror 4). The center of curvature $C_4$ of mirror 4 is at the center of lens 2. Mirror 6 has a different radius of curvature $R_6$ (and focal length $R_6/2$), so its center of curvature $C_6$ does not coincide with $C_4$. In the embodiment of FIG. 1, the radius of curvature $R_6$ exceeds the radius of curvature $R_4$. The focal length of the lens equals $R_4/2$ so, when it is energized by a pumping source of light 8, the lasing mode forms a spot of light on the center (axis) of each mirror. The laser operates in this mode because, for any other orientation, the light impinging on mirror 6 is not reflected precisely back upon itself, but is reflected at an angle, inhibiting the formation of the high energy density within the optical cavity that is necessary for lasing action to occur. (The same situation is obviously present when the radius of curvature $R_6$ is less than $R_4$.)

Figure 2:
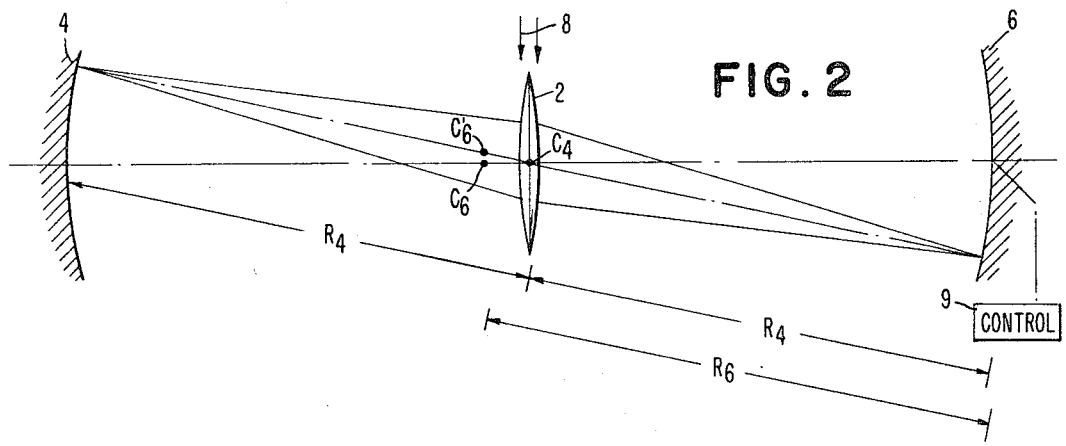
FIG. 2 is a diagram showing the operation of the first embodiment of the invention when the cavity is altered.

In FIG. 2, mirror 6 is slightly tilted about an axis that is perpendicular to the plane of the diagram by a mechanical control means 9 so that its center $C_6'$ is above the optical axis of the system. When tilted, a radial line from a point on the mirror that is below the axis intersects the center of lens 2, so the orientation of the lasing mode is deflected. As shown in FIG. 2, the orientation of the lasing mode is determined by the line connecting the centers of curvature $C_4$ and $C_6'$, for that is the only line which is radial to both mirrors 4 and 6.

The angle $\theta$ of orientation of the lasing mode is greater than the angle $\phi$ of tilt of the mirror 6, in accordance with:

$$\theta = \left(\frac{R_6}{R_6 - R_4}\right)\phi$$

Figure 3:
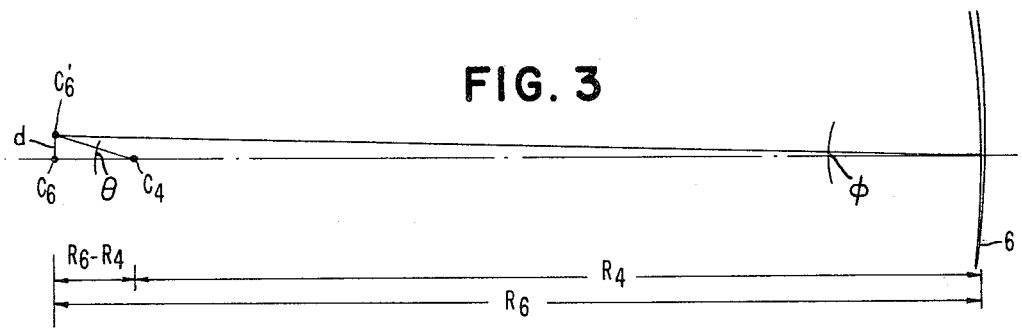
FIG. 3 is an explanatory diagram illustrating the geometry of the embodiment shown in FIGS. 1 and 2.

The geometry of this system is illustrated in FIG. 3, where the center of mirror 6 is displaced a distance $d$ from the point $C_6$ to the point $C_6'$, describing a tilt angle $\phi$ as shown. For small angles, $$\theta = \frac{d}{R_6 - R_4}$$

where $R_6 - R_4$ represents the distance between $C_4$ and $C_6$. Similarly, $\phi = d/R_6$. Thus, the relationship $$\theta = \left(\frac{R_6}{R_6 - R_4}\right)\phi$$

is present, showing that the angle of deflection of the laser beam is larger than the angle of tilt of the mirror by the factor $$\frac{R_6}{R_6 - R_4}$$

The laser output is provided to the object to be scanned by the light transmitted by either mirror 4 or 6 (or both mirrors).

As described above, the embodiment shown in FIGS. 1 and 2 provides a scanning beam which is controlled by movement of mirror 6, where a scanning line is produced by tilting the mirror. A two-dimensional raster can similarly be scanned by tilting mirror 6 such that its center of curvature moves into and out of the plane of the diagram, in addition to moving up and down. Alternatively, by using a mirror 4 with a different radius of curvature than the distance from the lens 2, both mirror 4 and mirror 6 can be simultaneously tilted to provide a corresponding composite change in the orientation of the lasing mode.

However, it is obviously necessary that the line joining the centers of curvature of the mirrors pass through the laser medium.

As a further modification, the function of the lens 2 (to image mirrors 4 and 6 upon each other) can be performed by any optical equivalent, such as a flat mirror located behind a lens having double the focal length of lens 2. In addition, the function of the lens (focussing objective) and the function of the laser medium can be separated by the use of a non-focussing medium with inactive (conventional) lenses.

Figure 4:
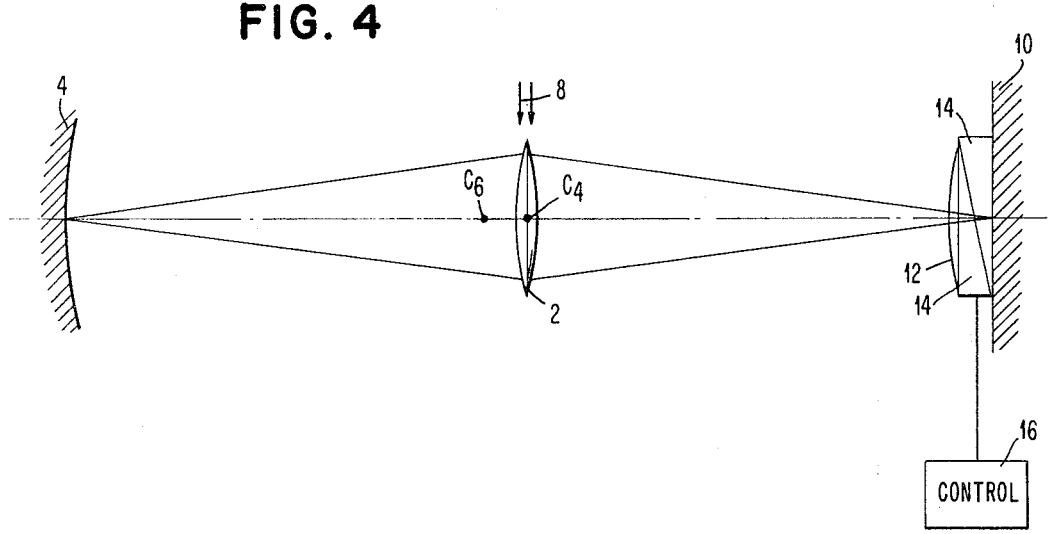
FIG. 4 is a diagram showing a second and preferred embodiment of the invention, which employs an electro-optically controllable cavity, in its quiescent state of operation.
Figure 5:
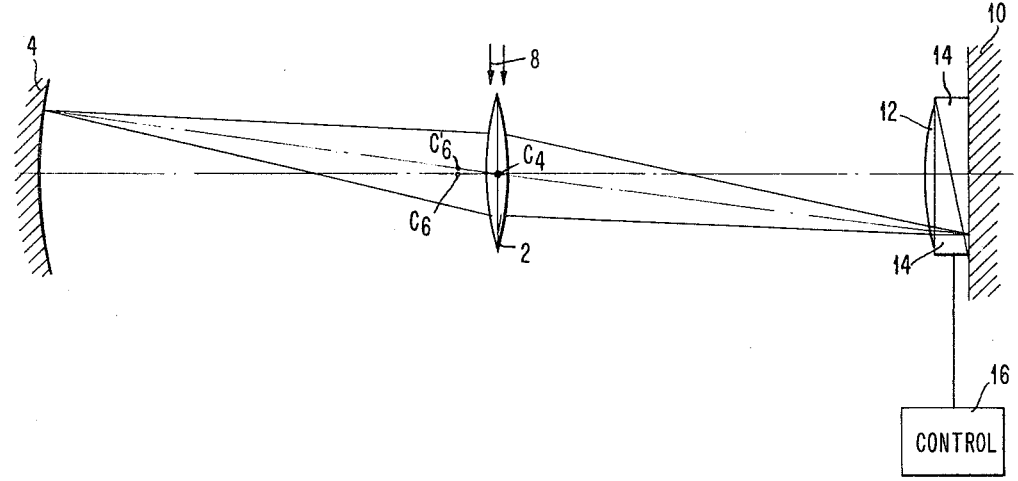
FIG. 5 is a diagram showing the operation of the second embodiment of the invention when the cavity is altered.

The preferred embodiment of the invention is shown on FIGS. 4 and 5. This embodiment differs from the embodiment of FIGS. 1 and 2 in that the spherical mirror 6 is replaced by a flat mirror 10 and a lens 12, where the focal length of the lens equal $R_6/2$. The mirror and lens arrangement is the well-known equivalent of a spherical mirror and its focal length corresponds to the focal length of a spherical mirror having a radius of curvature $R_6$. Thus, the reflector comprising mirror 10 and lens 12 has an effective center of curvature $C_6$.

An electro-optical deflector is located between the mirror 10 and the lens 12. The deflector comprises two deflecting prisms 14 of any type, including those described in an article Light Beam Deflection Using the Kerr Effect in Single Crystal Prisms of $BaTiO_3$ by W. Haas, R. Johannes, and P. Cholet in Applied Optics, vol. 3, No. 8, August 1964, at pages 988–989.

When no electric signals (or equal electric signals) are applied to deflectors 14, the light is undeflected and is reflected back upon itself, causing the lasing mode to be oriented along the optic axis of the device. When the electric signals from an electric control means 16 that are applied to one deflector 14 do not equal the signals that are applied to the other deflector, an effect is obtained that corresponds to the effect of physically tilting the mirror 6 in the first embodiment of the invention (FIGS. 1 and 2). The electric signals are applied (such as to the sides that are parallel to the plane of the diagram) of one or both deflectors 14, the electro-optic effect is equivalent to the tilt of a mirror in that the electric signals cause the index of refraction of the deflectors to change so that light which enters at an angle to the axis of the device is reflected back upon itself. In FIG. 5, the orientation of the lasing mode is shown to be altered in this manner. Thus, the application of electric signals to the deflectors 14 alters the effective center of curvature of the reflector (consisting of mirror 10, lens 12 and deflector 14) from $C_6$ to $C_6'$. Obviously, a single deflector 14 can be employed and the components properly arranged to compensate for the zero-signal deflection of the prism.

The orientation of the lasing mode scans a predetermined path by applying the corresponding modulated electric signal to the deflectors 14. The amount of change in the orientation of the lasing mode for a given change in effective angular deflection (due to elements 10, 12, 14) is the same as described above for the embodiment of FIGS. 1 and 2.

Two-dimensional scanning is provided by also replacing the spherical mirror 4 (FIG. 4) with a flat mirror, deflector and lens arrangement of the type used on the right side of the device. However, the deflectors are rotated by 90° to produce deflection into and away from the plane of the diagram. The resultant two-dimensional scan is a function of the composite modulating signals that are applied to both sets of deflectors.

Thus, in the present invention, a controllable cavity has been described wherein a focusing objective and active laser medium are arranged between two reflectors having effective centers of curvature. The orientation of the mode of operation of the device is controlled by either mechanically or electro-optically altering the effective geometry of the cavity. The laser mode is altered by a significantly greater angle than the angle of deflection that is applied to the cavity.

While the invention has been particularly shown and described with reference to preferred embodiments thereof, it will be understood by those skilled in the art that various changes in form and details may be made therein without departing from the spirit and scope of the invention. For example, the laser 2 can be spherical rather than in the shape of a thin lens. Furthermore, other deflection techniques, such as magnetic techniques can be employed.

What is claimed is:
1. An optical cavity comprising, in combination:
    a focussing objective;
    first and second reflectors, the first reflector having a radius of curvature and said second reflector having a radius of curvature different from the radius of curvature of said first reflector, said first and second reflectors having effective centers of curvature separated by a predetermined distance, that are arranged at the object and image positions for the objective;
    an active laser medium located between said two reflectors;
    and means for controlling the position of at least one of said effective centers of curvautre.

2. The device described in claim 1, wherein the focussing objective is a lens-shaped, active laser medium.

3. An optical scanner comprising, in combination:
    a lens-shaped, active laser medium having a central axis;
    a first reflector having a radius of curvature and an effective center of curvature;
    a second reflector having a radius of curvature different from the radius of curvature of said first reflector and an effective center of curvature that is separated from the effective center of curvature of the first reflector by a predetermined distance, where a line through the effective centers of curvature intersects the laser medium;
    means for activating the laser medium;
    and means for controlling the position of at least one effective center of curvature;
    whereby the orientation of the lasing mode is controlled.

4. The device described in claim 3, wherein the distances between the laser medium and each reflector, as measured along the central axis of the laser medium, are approximately equal to twice the focal length of the laser medium.

5. The device described in claim 4, wherein the effective centers of curvature of one reflector is positioned at the center of the laser medium, and wherein the effective center of curvature of the other reflector is controllably positioned along a line that is essentially perpendicular to the central axis of the laser medium.

6. The device described in claim 3, wherein the reflectors are spherical mirrors.

7. The device described in claim 4, wherein the reflectors are spherical mirrors.

8. The device described in claim 5, wherein the reflectors are spherical mirrors.

9. The device described in claim 3, wherein an effective center of curvature is electrooptically controlled.

10. The device described in claim 4, wherein an effective center of curvature is electro-optically controlled.

11. The device described in claim 5, wherein an effective center of curvature is electro-optically controlled.

12. The device described in claim 9, wherein the electro-optically controlled reflector comprises a flat mirror, a lens, at least one deflection means arranged between said mirror and said lens wherein the effective center of curvature of said reflector is electro-optically controllably positioned at a predetermined position from the center of curvature of said other reflector.

13. The device described in claim 10, wherein the electro-optically controlled reflector comprises a flat mirror, a lens, and at least one deflection means arranged between said mirror and said lens wherein the effective center of curvature of said reflector is electro-optically controllably positioned at a predetermined position from the center of curvature of said other reflector.

14. The device described in claim 11, wherein the electro-optically controlled reflector comprises a flat mirror, a lens, and at least one deflection means arranged between said mirror and said lens wherein the effective center of curvature of said reflector is electro-optically controllably position at a predetermined position from the center of curvature of said other reflector.

15. An optical scanner comprising in combination:
    a lens-shaped, active laser medium having a predetermined focal length and a central axis;
    a first spherical mirror whose radius of curvature is approximately equal to double the focal length of the laser medium, and whose center of curvature is approximately centered on the laser medium;
    a second spherical mirror having a radius of curvature different from the radius of curvature of said first spherical mirror and whose center of curvature is controllably positioned, at a predetermined distance from the center of curvature of the first mirror, where the distance between the second mirror and the center of the laser medium is approximately equal to double the focal length of the laser medium such that a point on said first mirror and a point on said second mirror are essentially at object-image positions with respect to the laser medium;
    means for activating the laser medium to cause a lasing mode whose orientation is represented by a spot of light being formed on the surface of each mirror at positions that are determined by a line that passes through the centers of curvature of the mirrors;
    and means for tilting the second mirror about an axis that is perpendicular to the central axis of the laser medium, to alter the center of curvature of the second mirror, and to correspondingly alter the orientation of the lasing mode.

16. An optical scanner comprising, in combination:
    a lens-shaped, active laser medium having a predetermined focal length;
    a spherical mirror whose radius of curvature is approximately equal to double the focal length of the laser medium, and whose center of curvature is approximately centered on the laser medium;
    reflecting means comprising an electro-optical deflector arranged between a flat mirror and a lens, where the effective center of curvature is electro-optically, controllably positioned at a predetermined distance from the center of curvature of the spherical mirror, and where the distance between the flat mirror and the center of the laser medium is approximately equal to double the focal length of the laser medium, such that a point on the spherical mirror and a point on the flat mirror are essentially at object-image positions with respect to the laser medium;

means for activating the laser medium to cause a lasing mode whose orientation is represented by a spot of light being formed on the surface of each mirror at positions that are determined by a line that passes through the center of curvature of the spherical mirror and the effective center of curvature of the reflector means;

and means for altering the deflection of the electro-optical deflector to alter the effective center of curva- of the reflecting means, and to correspondingly alter the orientation of the lasing mode.

References Cited

UNITED STATES PATENTS 3,244,073    4/1966    Bouwers et al. _____ 350—200

OTHER REFERENCES

Pole et al.: "Continuous Operation of a Ruby Laser During Pumping Pulse," Applied Optics, vol. 3, No. 9, p.p. 1086–1087, September 1964.

JEWELL H. PEDERSEN, *Primary Examiner.*

E. BAUER, *Assistant Examiner.*

U.S. Cl. X.R.

350—199